United States Patent [19]
Baumans et al.

[11] 3,894,275
[45] July 8, 1975

[54] LINEAR STEP MOTOR

[75] Inventors: Hans Baumans, Montreal; Gerald Turp, Dollard des Ormeaux; Huy Phan Van, Saint-Leonard, all of Canada

[73] Assignee: Centre de Recherche Industrielle du Quebec, Ste-Foy, Canada

[22] Filed: Dec. 11, 1973

[21] Appl. No.: 423,811

[52] U.S. Cl. .................. 318/38; 310/12; 318/115; 318/135; 318/187
[51] Int. Cl. ........................................... H02k 41/02
[58] Field of Search .................. 310/12–14, 310/135, 687, 115, 38

[56]        References Cited
            UNITED STATES PATENTS
3,162,796   12/1964   Schreiber et al. .................. 310/12 X
3,268,747   8/1966    Snowdon .......................... 318/135 X
3,566,224   2/1971    Vallauri et al. ..................... 318/138
R27,436     7/1972    Sawyer ............................. 310/12 X

*Primary Examiner*—Donovan F. Duggan
*Attorney, Agent, or Firm*—Cushman, Darby and Cushman

[57]            ABSTRACT

The disclosure herein describes a linear step motor wherein the active armature consists of a plate member of magnetic permeable material including a plurality of equally spaced pole faces of identical width and wherein the active armature consists of a core of magnetic permeable material including a series of parallel equally spaced pole pieces defining at one end thereof pole faces of identical width. The spacing between the pole faces of the active armature is equal to the spacing between the pole faces of the passive armature; but the width of the pole faces of the active armature differs from the width of the pole faces of the passive armature by a step value which is proportional to the number of pole pieces on the active armature.

9 Claims, 7 Drawing Figures

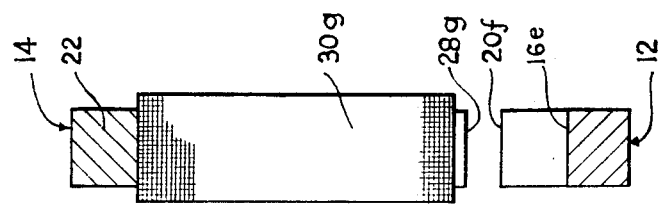
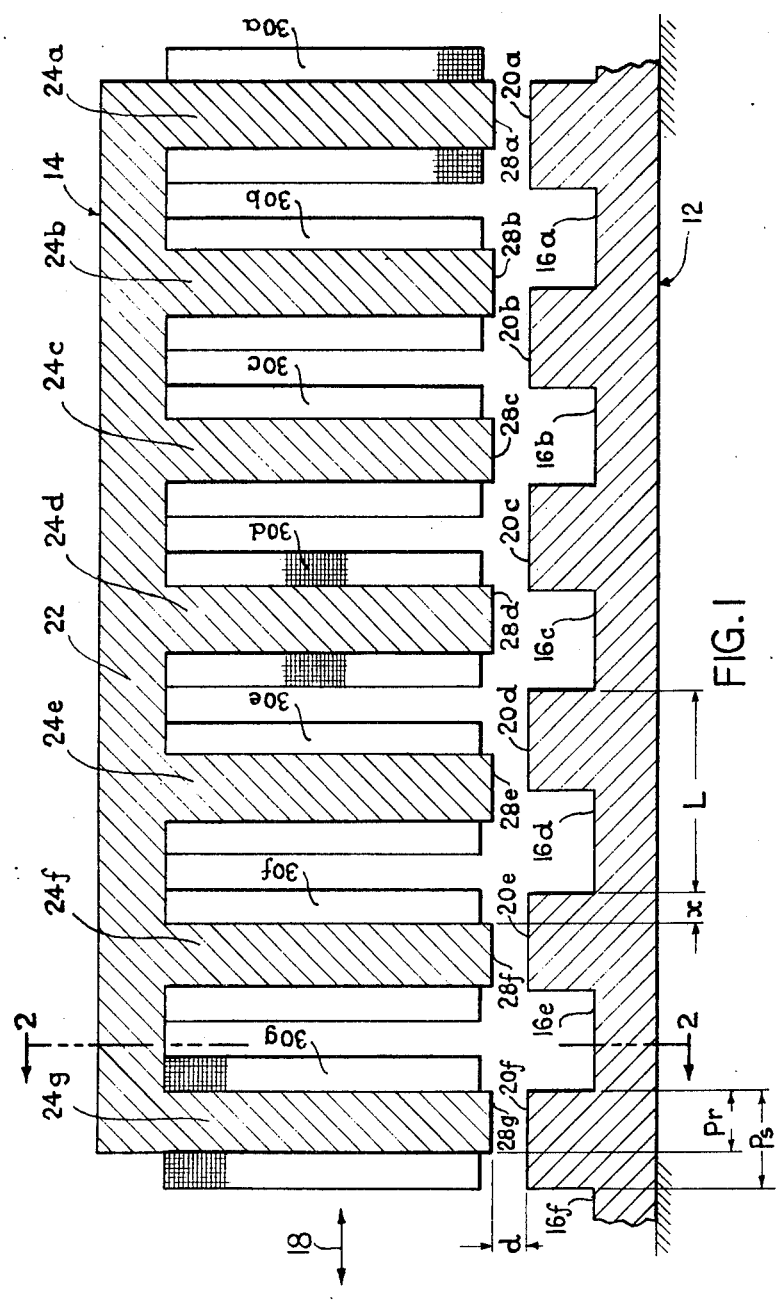

LINEAR STEP MOTOR

BACKGROUND OF THE INVENTION

This invention relates generally to electric motors.

In many technical fields arises frequently the need to generate linear motion or displacement of some device, such as a tool or a recorder pen, by means of electrical energy converted to a mechanical force acting along a linear path of motion. Many techniques are available to solve this problem, such as a spindle and leadscrew, a rack and pinion arrangement, various pulley arrangements each one driven by a rotary electric motor. All of these techniques require a relatively large number of parts and a fair degree of mechanical precision; consequently, they are rather costly.

To avoid some of these problems, the linear induction motor has been developed and is composed generally of a movable armature and a stationary armature, hereinafter respectively referred to as the active armature and the passive armature. A suitable electrical drive logic or control unit operates to excite the windings of a number of magnetically permeable poles on the active armature in such a manner that a magnetic field is created which produces magnetomotive forces between the active armature and the passive armature and urges the active armature to assume a mechanical position corresponding to a position where maximum magnetic flux is allowed. Means are also provided for changing the excitation state of the poles in a phase sequence thereby causing the active armature to move in a step-by-step fashion between several mechanical positions.

However, the performance of most linear induction motors is limited due to certain drawbacks. A linear motor operates efficiently only over a narrow speed range for a given frequency. Further, it cannot provide an indexing force at standstill, which force is important in certain applications where a linear motor is used. Also, modern control systems are frequently digital and this has brought about an additional difficulty; to drive an AC motor from a digital control system requires a complex interface including digital-to-analog or frequently-to-DC converters as well as modulators.

Accordingly, it is desirable to have a linear step motor which can be driven by DC pulses, each pulse advancing the armature by a unit step and where an indexing force is provided at each step.

SUMMARY OF THE INVENTION

The present invention resides in a novel linear step motor of the type that includes an active armature and a passive armature in spaced juxtaposition with one another. The passive armature consists of a plate member of magnetic permeable material that includes a plurality of equally spaced pole faces of identical width. The active armature consists of a core of magnetic permeable material that includes a series of parallel equally spaced pole pieces defining at one end thereof pole faces of identical width. It is wished to have it understood that, hereinafter, the width considered for any pole face is the one extending in the longitudinal direction of the displacement of the active armature. The spacing between the pole faces of the active armature is equal to spacing between the pole faces of the passive armature; however, the width of the pole faces of the active armature differs from the width of the pole faces of the passive armature by a step value which is proportional to the number of pole pieces of the active armature. The step value is calculated by the formula L/(M-1), wherein L is the pitch of the passive armature and M is the number of pole pieces. Excitation winding means are mounted on each pole piece and means are provided for selectively energizing the exicitation winding means in sequence and in pairs in such a manner that the magnetic field created produces magnetomotive forces between the associated pole faces of both armatures resulting in the displacement of the active armature in a position of maximum magnetic flux. Once this position is reached, an indexing force is provided to maintain the active armature in a standstill position until the next switching pulse is transmitted.

With the present invention, it is possible to develop a two-sided configuration for the same linear step motor wherein two passive armatures extend parallel and opposed with the active armature moving between the two. This alternative has the advantage that the attractive magnetomotive forces are largely cancelled so that a mechanism supporting the active armature can be made lighter and smaller.

In another form of the invention, an "area" motor is devised where the passive armature plate carries rows and columns of discrete pole pieces and where two active armatures of the single-sided configuration are mounted to a common plate and are free to move along two perpendicular axes. The drive pulses are switched to displace the assembly by one or several rows in the x-axis or y-axis coordinate. Such a motor can be utilized to carry out a scanning operation or to position an indicator in an x–y coordinate system.

BRIEF DESCRIPTION OF THE DRAWINGS

Other characteristic features of the present invention will be in part obvious from the accompanying drawings, and in part pointed out as the description of the invention progresses. In describing the invention in detail, reference will be made to accompanying drawings, in which like reference characters designate corresponding parts throughout the several views, and in which:

FIG. 1 is a schematic cross-sectional view in the longitudinal direction of the active and passive armatures of a linear step motor made in accordance with the present invention;

FIG. 2 is a cross-sectional view taken along lines 2—2 of FIG. 1;

DESCRIPTION OF A FIRST EMBODIMENT

Figure 3:
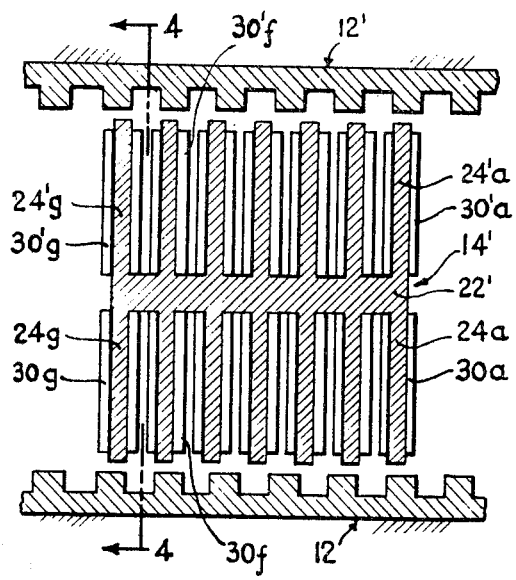
FIG. 3 shows a two-sided configuration of a linear step motor made in accordance with the present invention.

Referring now to FIGS. 1 and 2, the present invention comprises principally two major assemblies: a passive armature 12 and an active armature 14.

The passive armature 12 consists of a plate member made of a magnetic permeable material, such as solid soft iron or stacked transformer laminations of suitable grade, and includes plurality of parallel equally spaced grooves 16 extending transverse to the path of the displacement of the active armature 14, which displacement is indicated by arrow 18. These grooves 16 define a plurality of equally spaced upwardly projecting zones or teeth of magnetic permeable material each having an upper pole face 20. In the preferred embodiment illustrated in the drawings, the width of grooves 16a–16f is equal, in the direction of displacement of the active armature 14, to the width $P_s$ of the teeth 20a–20f. The grooves 16 may be left opened with the air serving as a non-magnetic material but they may also be filled with a plastic or other non-magnetic solid to provide a smooth upper surface for the plate member. The length of the passive armature 12 in the direction 18 is at least equal to the maximum range of linear motion desired.

The active armature 14 consists of a core of magnetic permeable material which may be either solid soft iron or stacked transformer laminations of a suitable grade. The core includes a connecting portion 22 and a series of downwardly extending equally spaced arms or pole pieces 24 having one end integrally mounted to the connecting portion 22 and defining at the other end pole faces 28. Excitation winding means, such as coils 30, are disposed about the pole pieces 24, the winding around adjacent pole pieces being in opposite direction. The spacing between the pole pieces 24 is equal to the width of grooves 16 and, consequently, in the preferred embodiment illustrated, equal to the pole faces 20. The widths $P_r$ of pole faces 28 in the longitudinal direction of the active armature are equal to one another and smaller than that of the widths $P_s$ of the pole faces 20 by a value x which is proportional to the number of pole pieces 24.

This value $x$ is calculated as follows;

$$x = \frac{L}{M-1}$$

where L is the pitch of the passive armature and M is the number of pole pieces. As hereinafter explained, this difference $x$ is also the step size of the linear motor.

Although the embodiment illustrated includes seven pole pieces, it is evident that this number can be varied. The lowest number of steps needed to travel the distance L is three; consequently, the lowest number of pole pieces or windings is four. Hence, the number of windings and pole pieces will vary as a function of the performance parameter selected.

OPERATION OF THE FIRST EMBODIMENT

Referring to FIG. 1, it is assumed that the relative position of armatures 12 and 14 represents an instant in time, at which windings 30f and 30g are energized by appropriate means. The current i flowing in these coils having N turns causes a magnetomotive force i.N which creates a mechanical force attracting both armatures to each other and an indexing force resisting the displacement along the direction of motion. Since windings 30f and 30g are respectively wrapped around pole pieces 24f and 24g in opposite direction, a current passing through both coils generates a magnetic field circulating in a clockwise or counter-clockwise direction via pole piece 24f, connecting portion 22, pole piece 24g, through pole faces 28g and 20f, in armature 12 and through pole faces 20e and 28f. Assuming that pole faces 28g and 20f, and pole faces 28f and 20e are not in complete facing alignment, there will exist between the non-aligned faces a magnetomotive force having a horizontal component which will tend to complete alignment of these faces. Once aligned, the only force is in the vertical direction and will assist in maintaining the active armature in a mechanical position corresponding to a stable magnetic-mechanical configuration, that is a mechanical position which results in maximum magnetic flux.

If the current i is now switched by some appropriate drive means to coils 30a and 30b, the magnetomotive forces created will include the above-mentioned horizontal force component which will cause an alignment of the pole faces 20a and 28a, and 20b and 28b. The active armature 14 will thus move to the left by the displacement or step corresponding to the value $x$. Switching the current to coils 30b and 30c will displace the armature by another step $x$. Switching the current in sequence to coils 30c and 30d, 30d and 30e, 30e and 30f will advance the armature each time by $x$. At the end of the complete cycle, the armature will have travelled the distance L, the pitch of the passive armature.

Reversing the sequence of energization of the coils will evidently reverse the direction of motion.

Figure 6:
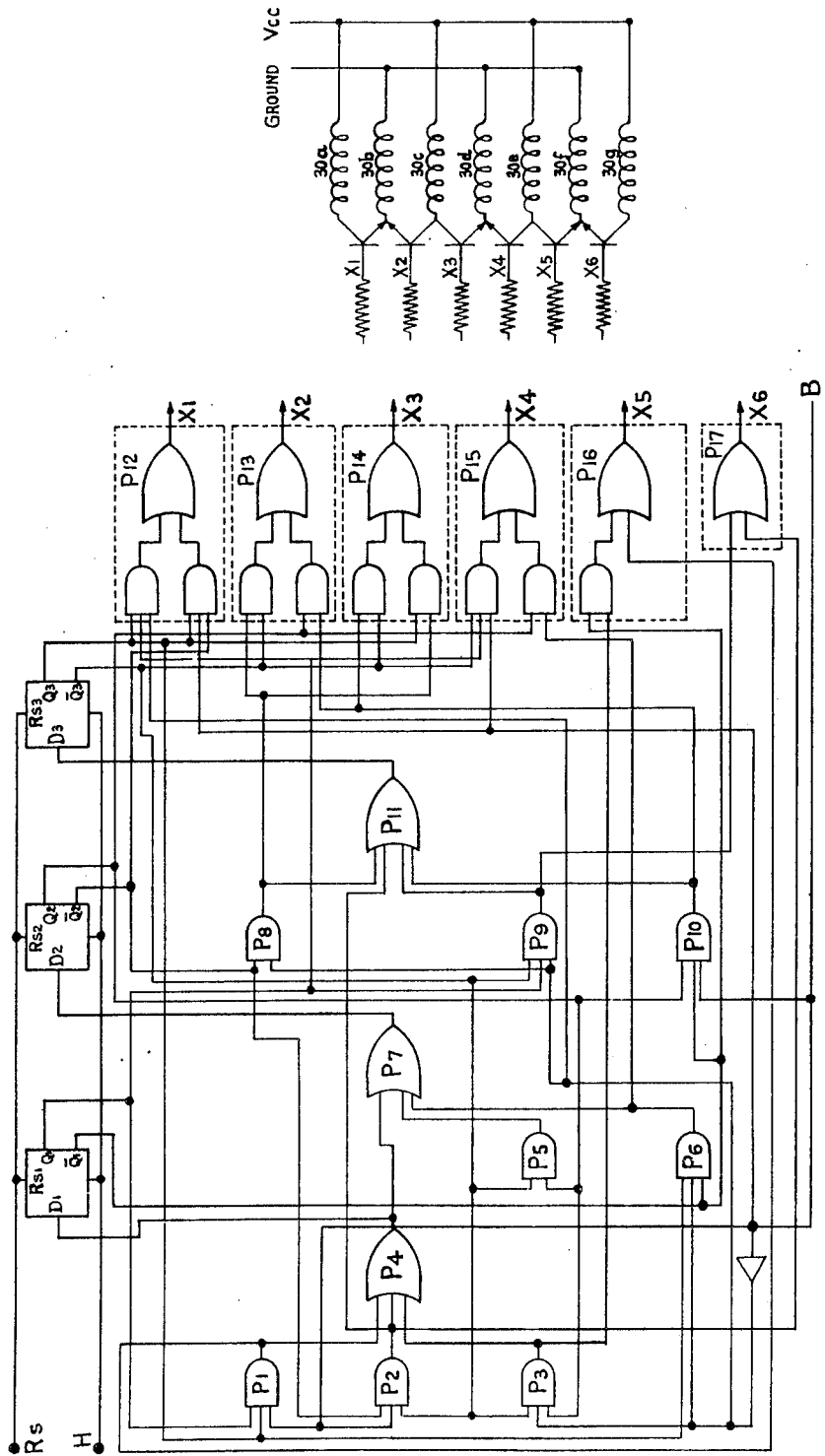
FIG. 6 is an electrical schematic diagram of a preferred circuitry for driving the system.

Many electrical driving circuits can be devised for energizing the windings in sequence and in pairs. However, one such typical driving circuit is illustrated in FIG. 6. It consists of a six-state sequential system wherein the outputs $X_1, X_2, X_3, X_4, X_5, X_6$ are connected to the coils of the active armature 14; for example, output $X_1$ is connected to coils 30a and 30b, output $X_2$ is connected to coils 30b and 30c, etc. The signal B (forward-reverse) provides the sweeping of a pulse from one end to the other in either direction (B = 0 from $X_1$ to $X_6$; B = 1 from $X_6$ to $X_1$) by means of pulses received from a timer resulting in the displacement of the motor in either direction as indicated by arrow 18 in FIG. 1.

Figure 7:
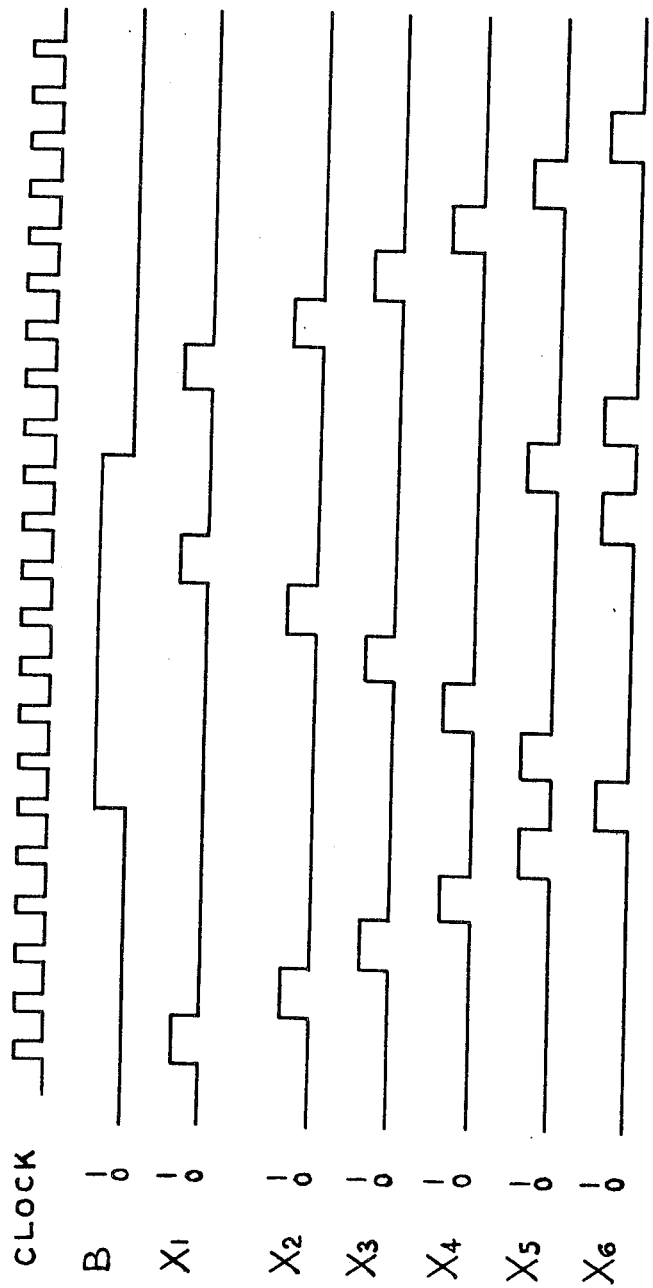
FIG. 7 illustrates wave forms for explaining the operation of the circuitry of FIG. 6.

The principle of this circuit is illustrated in FIG. 7. At rest, only one output is logic level 1; consequently, only one pole piece of the active armature is energized and the motor is at rest. To activate the system, the outputs $X_i$ (i = 1,2,3,4,5,6) successively change their logic level from 0 to 1. The duration of each state depends only on the timer frequency. To advance the active armature, the control signal B is set to logic level 0. Thus, for each successive pulse of the timer, each output $X_1$ to $X_6$ moves to logic lever 1 and, consequently, the pole pieces 24a to 24g are successively energized resulting in the displacement of the active armature. If B is at logic level 1, the outputs $X_1, X_6, X_5, X_4, X_3, X_2$ are energized and the motor reverses direction. FIG. 7 illustrates the shape of a wave for each of the six outputs $X_1$ to $X_6$ at the timer pulse rate and depending on the level of the control signal B. It is to be noted that the control signal B may be changed at will and synchronization of the entire system is done by the timer.

The circuit of FIG. 6 is made of three flip-flops of the D-type and of a certain number of logic gates AND, OR. The flip-flops keep in memory the actual state of the outputs $X_1$–$X_6$ and the logic gates energize the inputs of these flip-flops in order to change the state of the outputs at the subsequent timer pulse.

Any suitable source may be used for providing pulses for driving the active armature relative to the passive armature. Means for spacing the active armature from the passive armature to prevent direct contact between the members and for leaving an air gap $d$ are well known such as fluid bearings, wheel or ball suspensions. One such means is described in U.S. Pat. No. 3,376,578 issued Apr. 2, 1968 to B.A. Sawyer where a stream of fluid under pressure is directed into a series of cavities in the active armature.

DESCRIPTION OF OTHER EMBODIMENTS

Figure 4:
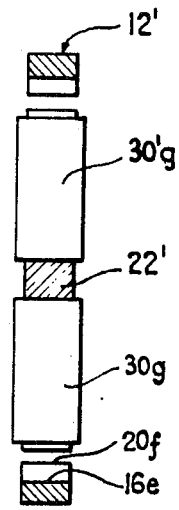
FIG. 4 is a cross-sectional view taken along lines 4—4 of FIG. 3.

Referring to FIGS. 3 and 4, there is shown a two-sided configuration of a linear step motor which embodied the present invention. Two passive armatures 12 and 12' of similar construction and configuration as that described for the embodiment illustrated in FIGS. 1 and 2, are disposed parallel and opposite to one another. An active armature 14' is received between these two armatures 12 and 12' and includes a connecting member 22' from which extends a second series of equally spaced parallel pole pieces 24' with coils 30' wrapped therearound. The construction of the upper portion of the core is a mirror image of the lower portion which has been described above in connection with FIGS. 1 and 2.

The pole faces of both passive armatures are accurately aligned with one another so that both passive armatures will be accurately aligned with the pole faces of the active armature 14'. The operation is also similar to the one described previously, except that, at one time, there are four coils which are energized, such as coils 30f, 30g, 30'f and 30'g.

One advantage of this structure is that the attractive forces are largely cancelled so that the supporting mechanism (not shown) can be made lighter and smaller.

Figure 5:
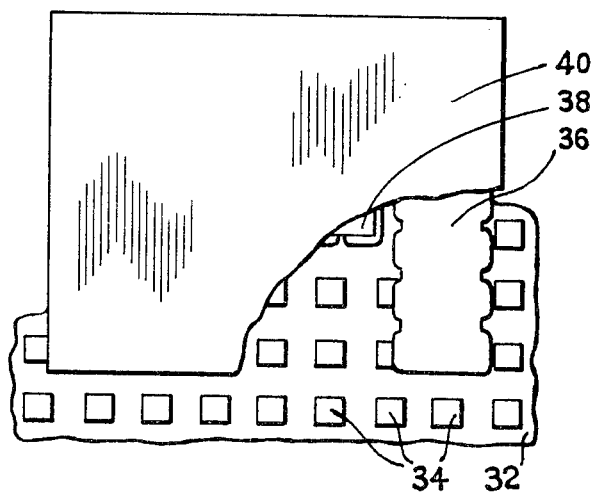
FIG. 5 is a top view, partly broken, of another embodiment of the present invention illustrating a linear step motor operable in the x and y axes by means of two active armatures.

FIG. 5 illustrates a linear step motor structure where the active armature may be moved in each of two coordinate directions by means of a plurality of active armatures made similarly to that illustrated in FIGS. 1 and 2. The passive armature is a base or plate 32 composed of rows and columns of interconnected and magnetically permeable discrete zones 34 which are enveloped by a non-magnetic material 84 filling spaces between the zones to form a smooth surface over which the active armature may be translated. The active armatures (two being shown at 36 and 38) are suitably attached to a top plate 40. Each of the armatures 36 and 38 operates independently in a manner similar to that of the armature described in relation to FIG. 1. Armatures 36 and 38 are arranged perpendicular to one another so that they may move in the $x$ and $y$ directions. When one active armature is mounted along the $x$-axis and aligned with a row of pole faces in that direction, it can be moved by sequentially switching its coils along the $x$-axis. Whenever the motor is mounted along the $y$-axis and aligned with a column of pole faces in that direction, the drive pulses can be switched to the $y$-axis armature to displace the assembly by one or several rows. A device of this kind can be utilized to carry out a scanning operation or to position an indicator in an $x$–$y$ (coordinate) system.

We claim:

1. In a linear step motor having an active armature and a passive armature in spaced juxtaposition to one another, said passive armature consisting of a plate member of magnetic permeable material including a plurality of equally spaced pole faces of identical width; said active armature consisting of a core of magnetic permeable material including a series of parallel equally spaced pole pieces defining at one end thereof pole faces of identical width; the spacing between the pole faces of said active armature being equal to the spacing between the pole faces of said passive armature; the width of the pole faces of said active armature differing from the width of the pole faces of the passive armature by a step value proportional to the number of pole pieces on the active armature; excitation winding means on each of said pole pieces; and means for selectively energizing said winding means in sequence and in pairs whereby the magnetic field created when a pair of winding means is energized by digital control pulses produces magnetomotive forces between the associated pole faces of said active and passive armatures resulting in the non-continuous displacement of the active armature in a position of maximum magnetic flux, an indexing force being provided between said armatures at standstill during the energization of said winding means and after the step displacement of said active armature.

2. In a linear step motor as defined in claim 1, the width of a pole face of said active armature being smaller than the width of a pole face of said passive armature, said value being equal to $L/(M-1)$ wherein L is the pitch of the passive armature and M is the number of pole pieces on said active armature.

3. In a linear step motor as defined in claim 2, the number of pole pieces being at least four, the width of said pole faces of said passive armature being equal to the space between said pole faces.

4. In a linear step motor, an active armature disposed between two parallel and oppositely spaced passive armatures in spaced juxtaposition with the active armature, each said passive armature consisting of a plate member of magnetic permeable material including a plurality of equally spaced pole faces of identical width; said active armature consisting of a core of magnetic permeable material including a connecting member centrally disposed between said passive armatures, a first set of parallel equally spaced pole pieces integrally mounted at one end thereof to the connecting member and defining at the other end thereof pole faces of identical width, and a second set of parallel equally spaced pole pieces integrally mounted at one end thereof on the opposite side of said connecting member and defining at the other end thereof pole faces of identical width; the spacing between the pole faces of said active armature being equal to the spacing between the pole faces of each said passive armature; the width of the pole faces of said active armature differing from the width of the pole faces of each said passive armature by a step value proportional to the number of pole pieces in each said set on the active armature; excitation winding means mounted on each of said pole pieces; and means for selectively energizing said winding means in each said set in sequence and in pairs whereby the magnetic field created when a pair of winding means is energized produces magnetomotive forces between the associated pole faces of said active and passive armatures resulting in the displacement of the active armature in a position of maximum magnetic flux, an indexing force being provided between said armatures at standstill during the energization of said winding means and after the step displacement of said active armature.

5. In a linear step motor as defined in claim 4, the width of a pole face of said active armature being smaller than the width of a pole face on each said passive armature, said value being equal to L/(M-1) wherein L is the pitch of each said passive armature and M is the number of pole pieces on said active armature.

6. In a linear step motor as defined in claim 5, the number of pole pieces in said first and second sets being at least four, the width of said pole faces of said passive armatures being equal to the space between said pole faces.

7. In a linear step motor having a passive armature and at least one pair of active armatures disposed perpendicular to one another and in spaced juxtaposition to said passive armature, said passive armature consisting of a plate member of magnetic permeable material including rows and columns of equally spaced pole faces of identical width; each said active armature consisting of a core of magnetic permeable material including a series of parallel equally spaced pole pieces defining at one end thereof pole faces of identical width; the spacing between the pole faces of each active armature being equal to the spacing between the pole faces of said passive armature; the width of the pole faces of each said active armature differing from the width of pole faces of the passive armature by a step value proportional to the number of pole pieces on each said active armature; excitation winding means on each said pole pieces; and means for selectively and independently energizing said winding means of each said active armature in sequence and in pairs whereby the magnetic field created when a pair of winding means is energized by digital control pulses produces magnetomotive forces between the associated pole faces of one active armature and said passive armature resulting in the non-continuous displacement of the said one active armature in the longitudinal direction of said one active armature and in a position of maximum magnetic flux, an indexing force being provided between said one active armature and said passive armature at standstill during the energization of said winding means and after the step displacement of said one active armature in its longitudinal direction.

8. In a linear step motor as defined in claim 7, the width of a pole face of each said active armature being smaller than the width of a pole face of said rows and columns of said passive armature, said value being equal to L/(M-1) wherein L is the pitch of the pole faces in a row or a column of said plate member and M is the number of pole pieces on each said active armature.

9. In a linear step motor as defined in claim 8, the nunber of said pole pieces being at least four, the width between said pole faces of said passive armature being equal to the space between said pole faces.

* * * * *